(12) United States Patent
Zhou et al.

(10) Patent No.: US 12,542,629 B2
(45) Date of Patent: Feb. 3, 2026

(54) RESOURCE SIGNAL RECEPTION CAPABILITY FOR MULTIPLE COMPONENT CARRIERS

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 18/258,482

(22) PCT Filed: Feb. 11, 2021

(86) PCT No.: PCT/CN2021/076610
§ 371 (c)(1),
(2) Date: Jun. 20, 2023

(87) PCT Pub. No.: WO2022/170609
PCT Pub. Date: Aug. 18, 2022

(65) Prior Publication Data
US 2024/0031086 A1    Jan. 25, 2024

(51) Int. Cl.
*H04L 5/00* (2006.01)
*H04W 72/0453* (2023.01)
*H04W 72/51* (2023.01)

(52) U.S. Cl.
CPC ............ *H04L 5/001* (2013.01); *H04L 5/0048* (2013.01); *H04W 72/0453* (2013.01); *H04W 72/51* (2023.01)

(58) Field of Classification Search
CPC .. H04L 5/001; H04L 5/0048; H04W 72/0453; H04W 72/51
See application file for complete search history.

(56) References Cited

U.S. PATENT DOCUMENTS

| 8,780,833 B2 | 7/2014 | Kim et al. |
| 10,945,100 B2 | 3/2021 | Rico Alvarino et al. |
| 2019/0349155 A1 | 11/2019 | Xu et al. |

FOREIGN PATENT DOCUMENTS

| CN | 110073692 A | 7/2019 |
| CN | 112262540 A | 1/2021 |

(Continued)

OTHER PUBLICATIONS

International Search Report and Written Opinion—PCT/CN2021/076610—ISA/EPO—Nov. 12, 2021.

(Continued)

*Primary Examiner* — Kevin C. Harper
(74) *Attorney, Agent, or Firm* — Harrity & Harrity LLP

(57) ABSTRACT

Various aspects of the present disclosure generally relate to wireless communication. In some aspects, a user equipment (UE) may transmit an indication of a number of resource signals that the UE is capable of receiving via multiple component carriers during a time period, the number of resource signals based at least in part on a reference slot of a reference component carrier of the multiple component carriers. The UE may receive a configuration for measuring resource signals based at least in part on transmission of the indication. Numerous other aspects are described.

35 Claims, 9 Drawing Sheets

(56) References Cited

FOREIGN PATENT DOCUMENTS

| WO | 2019152605 A1 | 8/2019 | |
|---|---|---|---|
| WO | WO-2019217738 | 11/2019 | |
| WO | WO-2020014019 A1 | 1/2020 | |
| WO | 2020146896 A1 | 7/2020 | |
| WO | WO-2021159447 A1 * | 8/2021 | ............ H04W 72/00 |

OTHER PUBLICATIONS

Mediatek Inc: "Capability for Dormant BWP Switching of Multiple SCells", R2-2102428, 3GPP TSG-RAN WG2 Meeting #113-e, eMeeting, Jan. 25-Feb. 5, 2021, Feb. 5, 2021, Feb. 10, 2021, section 6.3.3, 9 Pages.

Supplementary European Search Report—EP21925270—Search Authority—The Hague—Oct. 8, 2024.

* cited by examiner

RESOURCE SIGNAL RECEPTION CAPABILITY FOR MULTIPLE COMPONENT CARRIERS

CROSS-REFERENCE TO RELATED APPLICATION

This Patent Application is a 371 national stage of PCT Application No. PCT/CN2021/076610 filed on Feb. 11, 2021, entitled "RESOURCE SIGNAL RECEPTION CAPABILITY FOR MULTIPLE COMPONENT CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating resource signal reception capability for multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes transmitting an indication of a number of resource signals that the UE is capable of receiving via multiple component carriers during a time period, the number of resource signals based at least in part on a reference slot of a reference component carrier of the multiple component carriers; and receiving a configuration for measuring resource signals based at least in part on transmission of the indication.

In some aspects, a method of wireless communication performed by a base station includes receiving an indication of a number of resource signals that a UE is capable of receiving via multiple component carriers during a time period, the number of resource signals based at least in part on a reference slot of a reference component carrier of the multiple component carriers; and transmitting a configuration for measuring resource signals based at least in part on reception of the indication.

In some aspects, a UE for wireless communication includes a memory; and one or more processors operatively coupled to the memory, the memory and the one or more processors configured to: transmit an indication of a number of resource signals that the UE is capable of receiving via multiple component carriers during a time period, the number of resource signals based at least in part on a reference slot of a reference component carrier of the multiple component carriers; and receive a configuration for measuring resource signals based at least in part on transmission of the indication.

In some aspects, a base station for wireless communication includes a memory; and one or more processors operatively coupled to the memory, the memory and the one or more processors configured to: receive an indication of a number of resource signals that a UE is capable of receiving via multiple component carriers during a time period, the number of resource signals based at least in part on a reference slot of a reference component carrier of the multiple component carriers; and transmit a configuration for measuring resource signals based at least in part on reception of the indication.

In some aspects, a non-transitory computer-readable medium storing a set of instructions for wireless communication includes one or more instructions that, when executed by one or more processors of a UE, cause the UE to: transmit an indication of a number of resource signals that the UE is capable of receiving via multiple component carriers during a time period, the number of resource signals based at least in part on a reference slot of a reference component carrier of the multiple component carriers; and receive a configuration for measuring resource signals based at least in part on transmission of the indication.

In some aspects, a non-transitory computer-readable medium storing a set of instructions for wireless communication includes one or more instructions that, when executed by one or more processors of a base station, cause the base station to: receive an indication of a number of resource signals that a UE is capable of receiving via multiple component carriers during a time period, the number of resource signals based at least in part on a reference slot of a reference component carrier of the multiple component carriers; and transmit a configuration for measuring resource signals based at least in part on reception of the indication.

In some aspects, an apparatus for wireless communication includes means for transmitting an indication of a number of resource signals that the UE is capable of receiving via multiple component carriers during a time period, the number of resource signals based at least in part on a reference slot of a reference component carrier of the multiple component carriers; and means for receiving a configuration for measuring resource signals based at least in part on transmission of the indication.

In some aspects, an apparatus for wireless communication includes means for receiving an indication of a number of resource signals that a UE is capable of receiving via multiple component carriers during a time period, the number of resource signals based at least in part on a reference slot of a reference component carrier of the multiple component carriers; and means for transmitting a configuration for measuring resource signals based at least in part on reception of the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
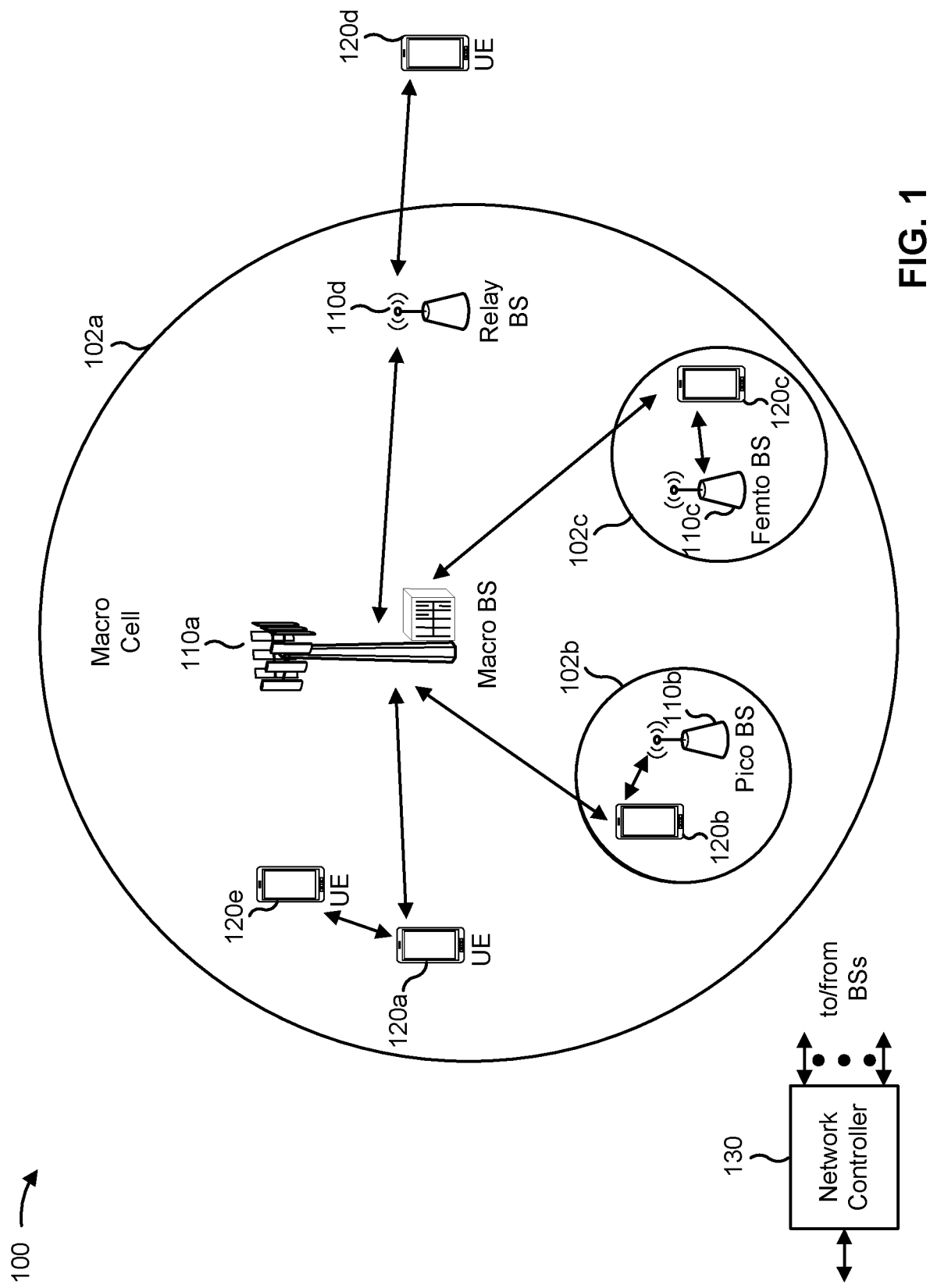
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each ULE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
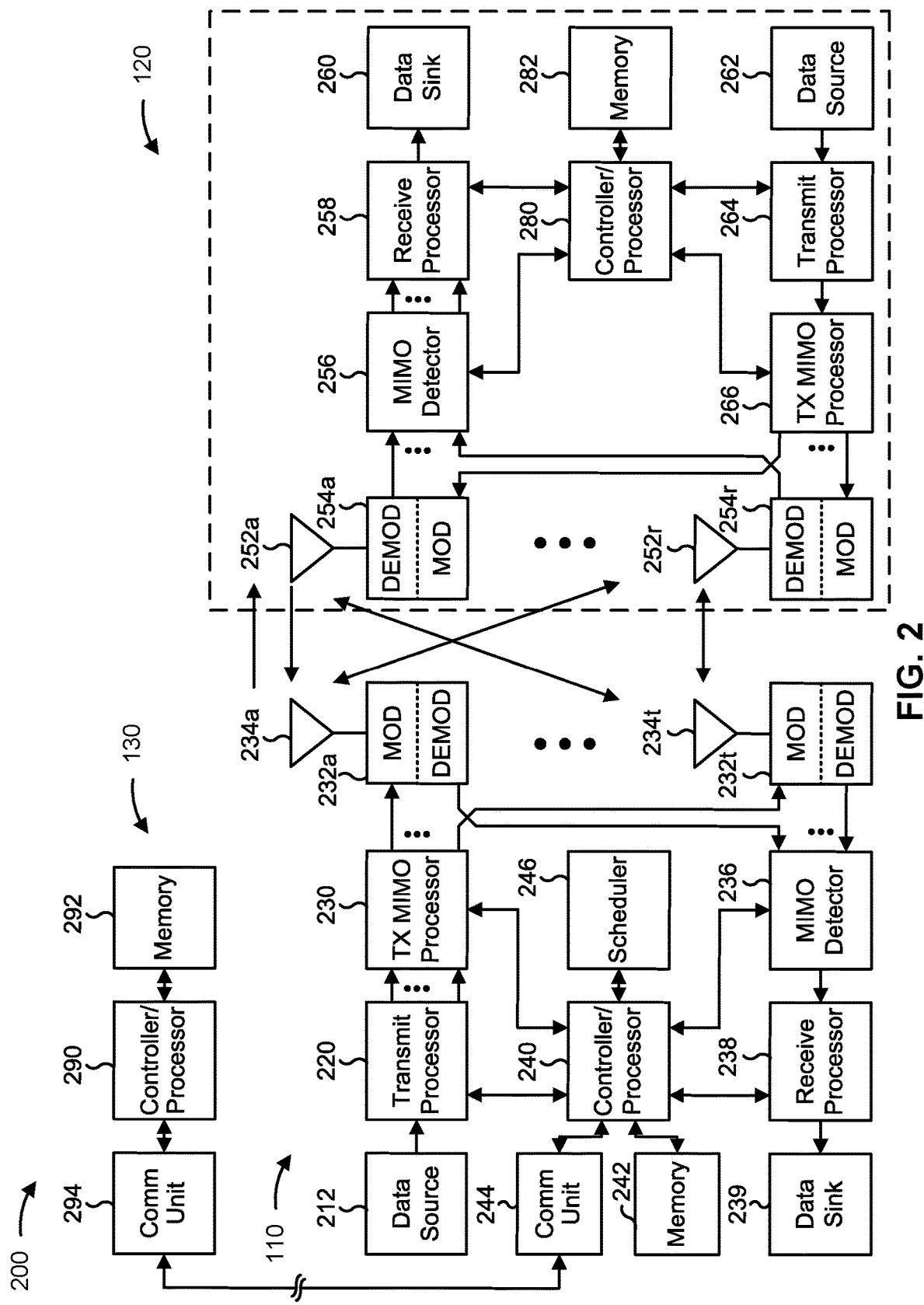
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with indicating resource signal reception capability for multiple component carriers, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for transmitting an indication of a number of resource signals that the UE is capable of receiving via multiple component carriers during a time period, the number of resource signals based at least in part on a reference slot of a reference component carrier of the multiple component carriers; or means for receiving a configuration for measuring resource signals based at least in part on transmission of the indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for incrementing a count of the resource signals based at least in part on usage of a resource signal for beam failure detection or for radio link management; means for incrementing the count of the resource signals based at least in part on usage of the resource signal for new beam identification, for pathloss measurement, or for layer 1 reference signal received power measurement; or means for incrementing the count of the resource signals based at least in part on each usage of the resource signal for layer 1 signal-to-interference-plus-noise ratio measurement.

In some aspects, the base station includes means for receiving an indication of a number of resource signals that a UE is capable of receiving via multiple component carriers during a time period, the number of resource signals based at least in part on a reference slot of a reference component carrier of the multiple component carriers; or means for transmitting a configuration for measuring resource signals based at least in part on reception of the indication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
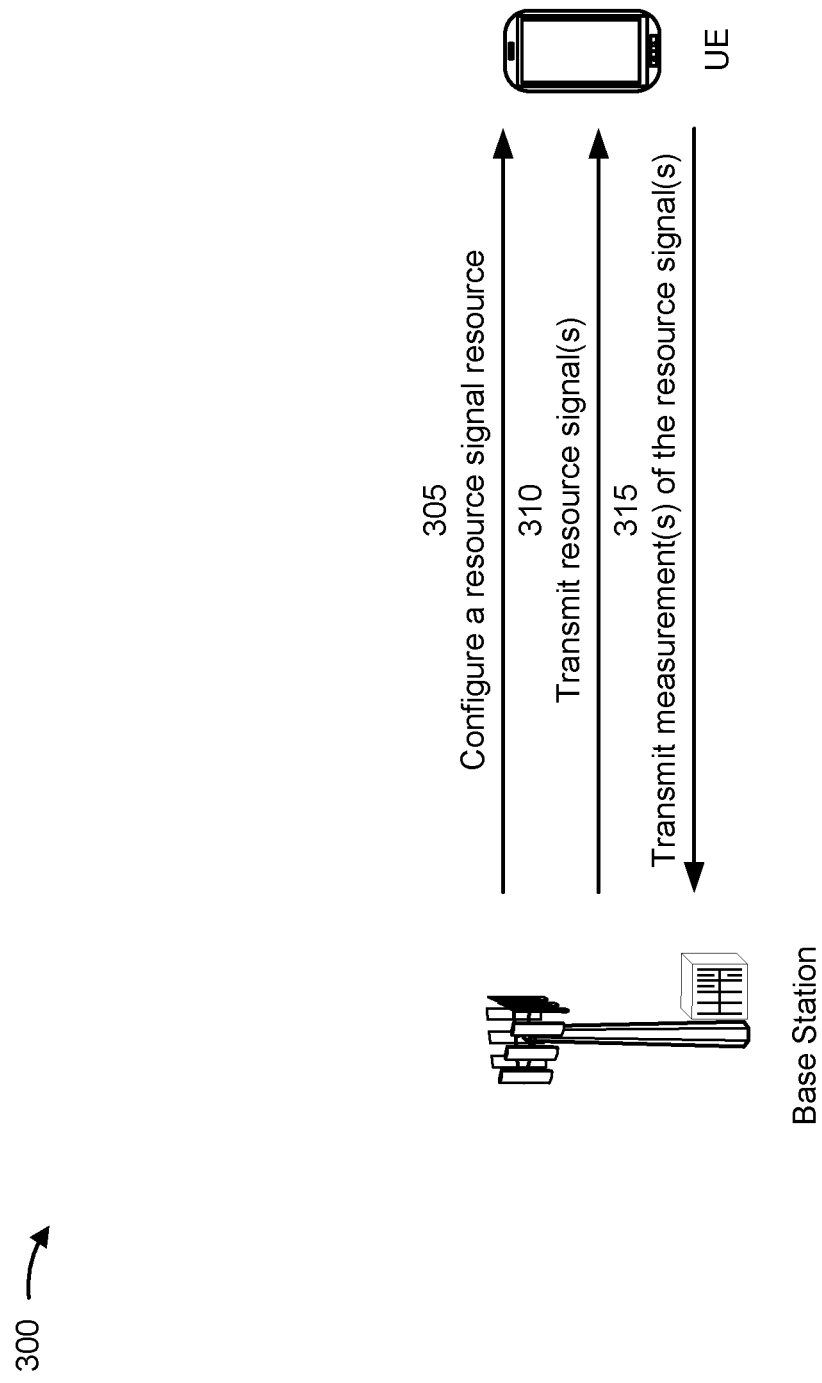
FIG. 3 is a diagram illustrating an example of configuring resource signals, in accordance with the present disclosure.

FIG. 3 is a diagram illustrating an example 300 of configuring resource signals, in accordance with the present disclosure. As shown in FIG. 3, a UE may communicate with a base station. In some aspects, the UE and the base station may be part of a wireless network (for example, wireless network 100). In some aspects, communications between the UE and the base station may include configuration information, control information, reference signals, and/or data, among other examples.

As shown by reference number 305, the base station may configure a resource signal resource for the UE. The resource signal resource may include an indication of resources for the UE to receive one or more resource signals from the base station. The one or more resource signals may include reference signals and/or synchronization signal blocks (SSBs), among other examples. Reference signals may include channel state information (CSI) reference signals (CSI-RSs) and/or pathloss reference signals (PL RSs), among other examples.

The resource signal resource may indicate a usage for the one or more resource signals. For example, the resource signal resource may indicate that the UE is to measure the one or more resource signals as part layer 1 (L1) signal-to-interference-plus-noise ratio (SINR) measurement, beam management (e.g., beam selection and/or beam refinement, among other examples), pathloss measurement, beam failure detection, radio link management, and/or new beam identification, among other examples. The resource signal resource may indicate that the UE is to measure the one or more resource signals across multiple frequency ranges.

As shown by reference number 310, the base station may transmit one or more resource signals to the UE. The UE may measure the one or more resource signals. Additionally, or alternatively, the UE may make a determination associated with an indicated usage for the one or more resource signals (e.g., determine a resource signal associated with a highest SINR measurement). The UE may further generate a report based at least in part on measurements of the one or more resource signals.

As shown by reference number 315, the UE may transmit one or more measurements of the one or more resource signals. For example, the UE may transmit a report that indicates at least a portion of the measurements of the one or more resource signals. Additionally, or alternatively, the UE may transmit an indication that is based at least in part on the measurements of the one or more resource signals (e.g., whether beam failure is detected).

As indicated above, FIG. 3 is provided as an example. Other examples may differ from what is described with regard to FIG. 3.

In some networks, a base station may configure a resource signal resource based at least in part on an indicated capability of a UE to receive resource signals. For example, the UE may indicate a number of resource signals that the UE is configured to receive during a time period, such as a slot. The indicated number of resource signals may include a number of resource signals that the UE is configured to receive, during the time period, via multiple component carriers. However, different component carriers may have different numerology. This may result in a first slot of a first component carrier, during which the UE may be configured to receive a first number of resource signals, to cross a slot boundary of a second slot of a second component carrier during which the UE may be configured to receive a second number of resource signals. The UE and the base station may not be synchronized on what resource signals the UE is to count for reporting the number of resource signals that the UE is capable to receive during the second slot (e.g., whether to count some or all of the first number of resource signals).

Based at least in part on the UE and the base station not being synchronized, the base station may transmit more resource signals than the UE is configured to receive during the second slot, which may consume network, communication, power, and/or computing resources to communicate unreceived resource signals, to report on measurements of resource signals that exclude the unreceived resource signals, and/or to configure subsequent communications without information associated with the unreceived resource signals. Additionally, or alternatively, the base station may transmit fewer resource signals than the UE is configured to receive during the second slot, which may inefficiently use network, communication, power, and/or computing resources to transmit a reduced number of resource signals, to report on measurements of the reduced number of resource signals, and/or to configure subsequent communications with a reduced amount of information based at least in part on failing to use additional resource signals that the UE is capable of receiving.

In some aspects described herein, a UE may transmit an indication of a number of resource signals that the UE is capable of receiving via multiple component carriers during a time period. The number of resource signals may be based at least in part on a reference slot of a reference component carrier of the multiple component carriers. In some aspects, the number of resource signals may include a number of resource signals that the UE is capable of receiving during, at least partially, the reference slot. For example, the number of resource signals may include a number of resource signals that the UE is capable of receiving in the reference slot via the reference component carrier and a number of additional resource signals that the UE is capable of receiving via additional component carriers when the reference slot (e.g., a time period associated with the reference slot) includes a starting symbol of the additional resource signals, when the reference slot includes a last symbol of the additional resource signals, or when the reference slot includes at least one symbol of the additional resource signals. In some aspects, the reference component carrier may have a slot duration that is a shortest duration for the multiple component carriers.

In some aspects, the UE may transmit the indication of the number of resource signals that the UE is capable of receiving via multiple component carriers during the time period for different types of resource signals. For example, the resource signals may be associated with SSB/CSI-RS for L1-SINR measurement, for beam management, pathloss measurement, beam failure detection, radio link monitoring (RLM), and/or new beam identification. In some aspects, the resource signals may be associated with component carriers on only a single frequency range (e.g., FR2, among other examples) or for multiple frequency ranges (e.g., FR1 and FR2 or all frequency ranges used by the UE for communication with the base station, among other examples).

In some aspects, the number of resource signals indicated by the UE may be based at least in part on usage of the resource signals. One resource signal may be used for multiple different usages. Further, even for a same usage, the resource signal may be used or referred for multiple times. For example, if one resource signal (e.g., reference signal resource) is used for one or multiple of beam failure detection (BFD) measurements or RLM measurements (e.g., basic usage 1), the resource signal may be counted as one resource signal. If one resource signal is used for one or multiple of new beam identification (NBI), pathloss measurement (e.g., a PL RS), or L1-RSRP measurement (e.g., collectively, basic usage 2), the UE may add one count to the number of resource signals. In some aspects, the L1-RSRP measurement may include cases associated with CSI reports with higher layer parameter "reportQuantity" set to "ssb-Index-RSRP", "cri-RSRP", or with higher layer parameter "reportQuantity" set to "none" and CSI-RS-ResourceSet with higher layer parameter "trs-Info" not configured. If one resource signal is used for L1-SINR measurement in addition to basic usage 1 and basic usage 2, the UE may add N counts to the number of resource signal if the resource signal is referred N times by one or more CSI reporting settings with higher layer parameter 'reportQuantity-r16" set to "ssb-Index-SINR-r16" or "cri-SINR-r16". For example, a resource signal count may be 1 if the resource signal is used for any times in beam failure detection or radio link management. The resource signal count may add 1 count for the resource signal if the resource signal is used in any times of NBI, PL RS measurement, and/or L1-RSRP measurement. The resource count may add N counts if the resource signal is used for N times in L1-SINR measurements.

Based at least in part on the UE and the base station being synchronized for reporting a number of resource signals that the UE is configured to receive via multiple component carriers (e.g., with different numerologies), the base station may transmit a number of resource signals that the UE is configured to receive during a time period (e.g., a reference slot). This may conserve network, communication, power, and/or computing resources that may have otherwise been used to transmit more resource signals than the UE is configure to receive, which may otherwise have cause the UE to report on measurements of resource signals that exclude the unreceived resource signals, and/or to configure subsequent communications without information associated with the unreceived resource signals. Additionally, or alternatively, this may conserve network, communication, power, and/or computing resources that may have otherwise been used based at least in part on the base station transmitting fewer resource signals than the UE is configured to receive during the second slot, which may have otherwise inefficiently used network, communication, power, and/or computing resources to transmit a reduced number of resource signals, to report on measurements of the reduced number of resource signals, and/or to configure subsequent communications with a reduced amount of information based at least in part on failing to use additional resource signals that the UE is capable of receiving.

Figure 4:
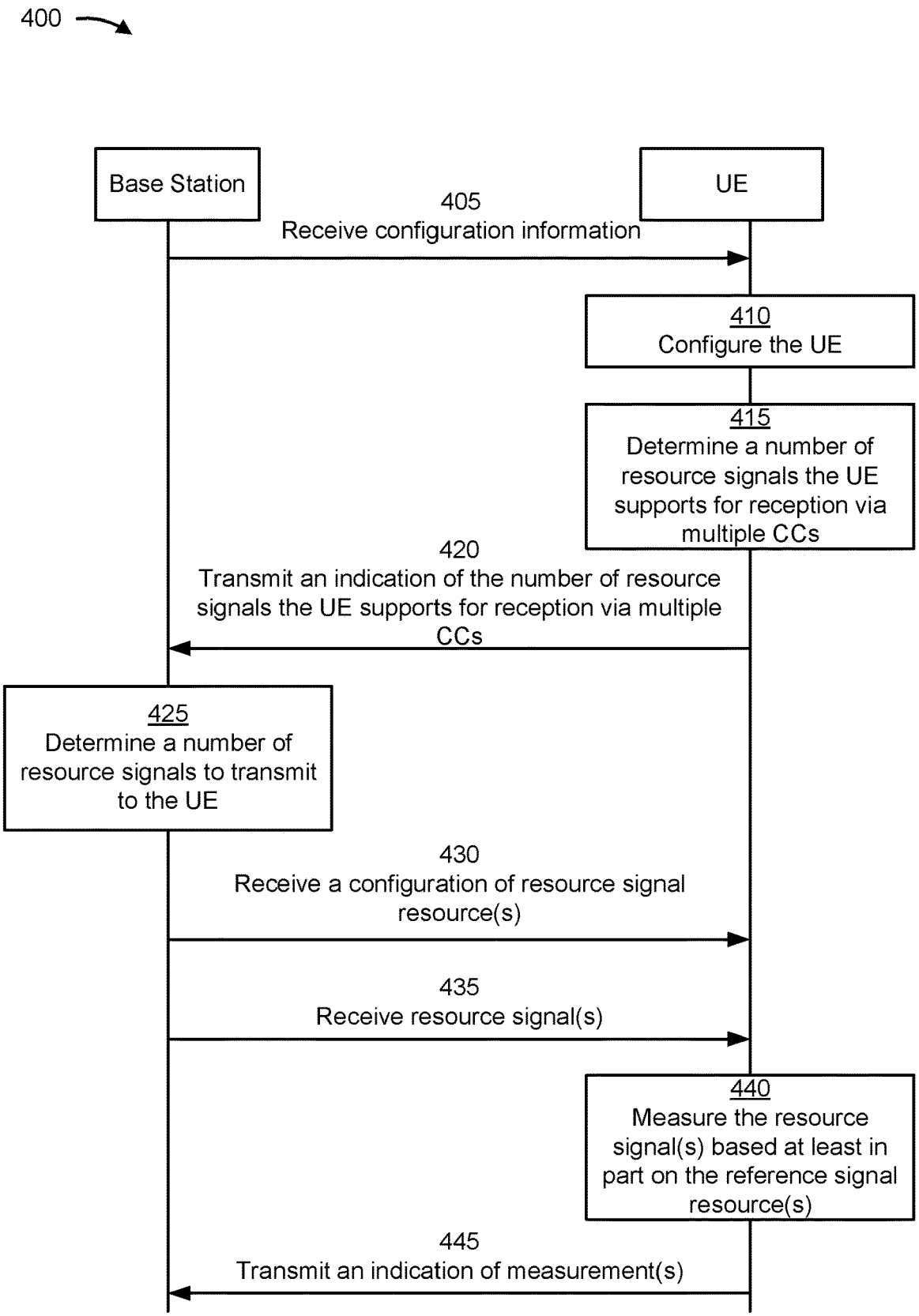
FIGS. 4 and 5 are diagrams illustrating examples associated with resource signal reception capability for multiple component carriers, in accordance with the present disclosure.

FIG. 4 is a diagram illustrating an example 400 of indicating resource signal reception capability for multiple component carriers, in accordance with the present disclosure. As shown in FIG. 4, a UE (for example, UE 120) may communicate with a base station (for example, base station 110). In some aspects, the UE and the base station may be part of a wireless network (for example, wireless network 100). In some aspects, the UE and the base station may communicate via one or more component carriers.

As shown by reference number 405, the UE may receive configuration information (for example, from the base station, another UE, or another base station, among other examples) or determine the configuration information based at least in part on a communication standard. In some aspects, the UE may receive the configuration information via one or more of a system information block, radio resource control (RRC) signaling, medium access control control elements (MAC CEs), or a sidelink communication, among other examples. In some aspects, the configuration information may include an indication of one or more configuration parameters (for example, parameters already known to the UE) for selection by the UE, or explicit configuration information for the UE to use to configure the UE, among other examples.

In some aspects, the configuration information may indicate that the UE is to determine a number of resource signals that the UE supports for reception via multiple component carriers (e.g., a number of resource signals that the UE is capable of receiving during a time period). In some aspects, the configuration information may indicate how the UE is to determine the number of resource signals that the UE supports for reception via multiple component carriers. In some aspects, the configuration information may indicate that the UE is to transmit an indication of the number of resource signals that the UE supports for reception via multiple component carriers. In some aspects, the configuration information may indicate how the UE is to transmit the indication of the number of resource signals that the UE supports for reception via multiple component carriers.

As shown by reference number 410, the UE may be configured based at least in part on the configuration information. In some aspects, the UE may be configured to perform one or more operations described herein.

In a third operation 415, the UE may determine the number of resource signals that the UE supports for reception via multiple component carriers. In some aspects, a number of resource signals that the UE is capable of receiving via the multiple component carriers may be based at least in part on a time period, such as a slot, a sub-slot, or a set of slots. In some aspects, the number of resource signals may be based at least in part on a reference slot of a reference component carrier of the multiple component carriers.

In some aspects, a numerology of the reference component carrier may be different from a numerology of a non-reference component carrier of the multiple component carriers. For example, the numerology of the time domain resource may be based at least in part on a numerology of a reference slot. In some aspects, the reference component carrier may be configured with a shortest slot duration of the multiple component carriers. In some aspects, the number of resource signals that the UE supports for reception via multiple component carriers may include a number of resource signals that the UE supports for reception via multiple component carriers during a slot, a sub-slot, a set of slots, or another time-domain resource.

The number of resource signals is based at least in part on time durations of the resource signals. In some aspects, the number of resource signals may be based at least in part on a number of resource signals having a starting symbol within the reference slot (e.g., for the reference component carrier and/or one or more non-reference component carriers). In some aspects, the number of resource signals may be based at least in part on a number of resource signals includes resource signals having a last symbol within the reference slot. In some aspects, the number of resource signals may be based at least in part on a number of resource signals having at least one symbol within the reference slot.

In some aspects, the number of resource signals may be based at least in part on usage of the resource signals. For example, an SSB or CSI-RS may be used for L1-SINR measurement. The number of resource signals may be based at least in part on (e.g., limited by) one or more per slot limitations, one or more memory limitations, or one or more other limitations. For example, the slot limitations may include a maximum number of SSBs or CSI-RS (of 1Tx or single port) for channel management resources (CMR), a maximum number of CSI-interference measurement (CSI-IM) resources or non-zero-power (NZP) interference measurement resources (IMR), and/or a maximum number of CSI-RS (of 2Tx or two ports) resources for CMR, among other examples. The reference slot duration may be the shortest slot duration defined for a frequency range of an associated UE band (e.g., where a UE reported band belongs). The CSI-RS resources configured as CMR without dedicated IMR may be counted both as CMR and IMR. An SSB/CSI-RS resource may be counted within the duration of a reference slot in which the corresponding reference signals are transmitted. The memory limitations may include a maximum number of SSB resources or CSI-RS resources as CMR and/or a maximum number of CSI-IM/NZP IMR resources, among other examples. In some aspects, the configured CSI-RS resources for both active and inactive bandwidth parts (BWPs) may be counted. Other limitations may include a supported density of CSI-RSs (e.g., used as CMR), a limitation that a maximum number of aperiodic CSI-RS resources across all component carriers (CCs) configured to measure L1-SINR (including CMR and IMR) shall not exceed a specific number such as MD_1, and/or supported SINR measurements, among other examples.

In some aspects, the number of resource signals may be based at least in part on usage of the resource signals as resources for beam management, pathloss measurement, BFD, RLM, and/or NBI. For example, the number of resource signal may be based at least in part on (e.g., limited by) a maximum total number of SSB/CSI-RS/CSI-IM resources configured to measure within a slot across all CCs in one frequency range for any of L1-RSRP measurement, L1-SINR measurement, pathloss measurement, BFD, RLM and/or NBI. In some aspects, the resource signal configured to measure may only be counted for those in active BWP. Additionally, or alternatively, the number of resource signal may be based at least in part on (e.g., limited by) a maximum total number of SSB/CSI-RS/CSI-IM resources configured across all CCs in one frequency range for any of L1-RSRP measurement, L1-SINR measurement, pathloss measurement, BFD, RLM and/or NBI. In some aspects, the configured resource signal may be counted for all configured resource signals including, for example, both active and inactive BWP. For a resource signal configured for new beam identification, the resource signal may be counted regardless of a beam failure event. The reference slot duration may be the shortest slot duration defined for the reported frequency range supported by the UE. The resource signals that the UE is configured to measure may be counted within the duration of a reference slot in which the corresponding reference signals are transmitted.

In some aspects, the number of resource signals may be based at least in part on usage of the resource signals as resources for beam management, pathloss measurement, BFD, RLM, and/or NBI across frequency ranges (e.g., multiple frequency ranges or all frequency ranges of the UE, among other examples. For example, the number of resource signal may be based at least in part on (e.g., limited by) a maximum total number of SSB/CSI-RS/CSI-IM resources configured to measure within a slot across all CCs for any of L1-RSRP measurement, L1-SINR measurement, pathloss measurement, BFD, RLM and/or NBI. Additionally, or alternatively, the number of resource signal may be based at least in part on (e.g., limited by) a maximum total number of SSB/CSI-RS/CSI-IM resources configured across all CCs for any of L1-RSRP measurement, L1-SINR measurement, pathloss measurement, BFD, RLM and/or NBI. The number of resource signals may apply to the shortest slot duration defined in any frequency ranges that are supported by the UE. The resource signal configured for the UE to measure may be counted within the duration of a reference slot in which the corresponding reference signals are transmitted.

In some aspects, the number of resource signals may be based at least in part on a configuration of the UE (for example, a power state of the UE), components of the UE (for example, one or more per slot limitations, one or more memory limitations, a number of baseband components of the UE, a number of antenna groups of the UE, or computing components of the UE, among other examples), or an operation mode of the UE (for example, a dual connectivity mode). In some aspects, the configuration of the UE may be based at least in part on the configuration information received, for example, from the base station.

In some aspects, the number of resource signals that the UE supports for reception via multiple component carriers may include a number of resource signals that the UE supports for reception via a first set of component carriers of a first frequency range or a number of resource signals that that the UE supports for reception via a second set of component carriers of a second frequency range (for example, separate quantities per frequency range (maxNumberResWithinSlotAcrossCC-OneFR-r16)).

In some aspects, the number of resource signals that the UE supports for reception via multiple component carriers may include a number of resource signals that the UE supports for reception via a set of component carriers of multiple frequency ranges (maxTotalResourcesForAcrossFreqRanges-r16). For example, the number of resource signals that the UE supports for reception via multiple component carriers may include a total number of resource signals that the UE supports for the first frequency range and the second frequency range (for example, a combined number for two or more frequency ranges).

In some aspects, the number of resource signals that the UE supports for reception via multiple component carriers may include a maximum number of resource signals that the UE supports for reception via multiple component carriers. In some aspects, the number of resource signals that the UE supports for reception via multiple component carriers may include a selected number, that is less than or equal to the maximum number, of resource signals that the UE supports for reception via multiple component carriers.

As shown by reference number 420, the UE may transmit, and the base station may receive, an indication of the number of resource signals that the UE supports for reception via multiple component carriers (for example, maxTotalResourcesForAcrossFreqRanges-r16 or maxNumberResWithinSlotAcrossCC-OneFR-r16). In some aspects, the indication may indicate a number of resources associated with the resource signals that the UE supports for reception via multiple component carriers. For example, the number of resources may be a number of resources across all component carriers in a single frequency range, or in all frequency ranges, among other examples. In some aspects, the indication may indicate a number of resource signals the UE supports for reception via multiple component carriers (for example, to measure) within a slot (for example, across all component carriers in a frequency range) (for example, maxNumberResWithinSlotAcrossCC-AcrossFR-r16). In some aspects, the UE may transmit the indication via a control message. For example, the UE may transmit the indication via a physical uplink control channel communication.

As shown by reference number 425, the base station may determine a number of resource signals to transmit to the UE for reception via multiple component carriers. In some aspects, the number may be based in part on the indication of the number of resource signals that the UE supports for reception via multiple component carriers. For example, the number of resource signals to transmit to the UE may be a same number as, or a number that is less than, the number of resource signals that the UE supports for reception via multiple component carriers. In some aspects, the base station may determine to transmit a number that is less than the number of resource signals that the UE supports for reception via multiple component carriers based at least in part on cell traffic or a likelihood of beam failure detection (for example, based at least in part on channel condition metrics, RSRP parameters, RSSI parameters, RSRQ parameters, or CQI parameters, among other examples).

As shown by reference number 430, the UE may receive, and the base station may transmit, a configuration of one or more resource signal resources. The configuration may indicate resources for the UE to receive one or more resource signals from the base station. The one or more resource signals may include reference signals and/or SSBs, among other examples. Reference signals may include CSI-RSs and/or PL RSs, among other examples.

As shown by reference number 435, the UE may receive via multiple component carriers, and the base station may transmit, one or more resource signals (for example, within a slot). Receiving the number of resource signals may include measuring the number of resource signals, attempting to measure the number of resource signals, and/or generating a report of measurements of the number of resource signals. In some aspects, the UE may use a single resource signal for multiple purposes, such as beam failure detection, radio link management, NBI, PL RS measurement, and/or L1-RSRP measurement.

As shown by reference number 440, the UE may measure the one or more resource signals based at least in part on the one or more reference signal resources. In some aspects, the UE may attempt to detect and measure the resource signals for multiple purposes and/or to generate an associated report.

As shown by reference number 445, the UE may transmit an one or more measurements of the resource signals. In some aspects, the UE may transmit the one or more measurements explicitly (e.g., explicit indications of the measurements) or implicitly (e.g., an indication based at least in part on the measurements). In some aspects, the UE may transmit the one or more measurements via a control message.

Based at least in part on the UE and the base station being synchronized for reporting a number of resource signals that the UE is configured to receive via multiple component carriers (e.g., with different numerologies), the base station may transmit a number of resource signals that the UE is configured to receive during a time period (e.g., a reference slot). For example, the UE may indicate a number of resource signals based at least in part on time durations of resource signals (e.g. on non-reference component carriers) and/or usage of the resource signals. This may conserve network, communication, power, and/or computing resources that may have otherwise been used to transmit more resource signals than the UE is configure to receive, which may otherwise have cause the UE to report on measurements of resource signals that exclude the unreceived resource signals, and/or to configure subsequent communications without information associated with the unreceived resource signals. Additionally, or alternatively, this may conserve network, communication, power, and/or computing resources that may have otherwise been used based at least in part on the base station transmitting fewer resource signals than the UE is configured to receive during the second slot, which may have otherwise inefficiently used network, communication, power, and/or computing resources to transmit a reduced number of resource signals, to report on measurements of the reduced number of resource signals, and/or to configure subsequent communications with a reduced amount of information based at least in part on failing to use additional resource signals that the UE is capable of receiving.

As indicated above, FIG. 4 is provided as an example. Other examples may differ from what is described with regard to FIG. 4.

Figure 5:
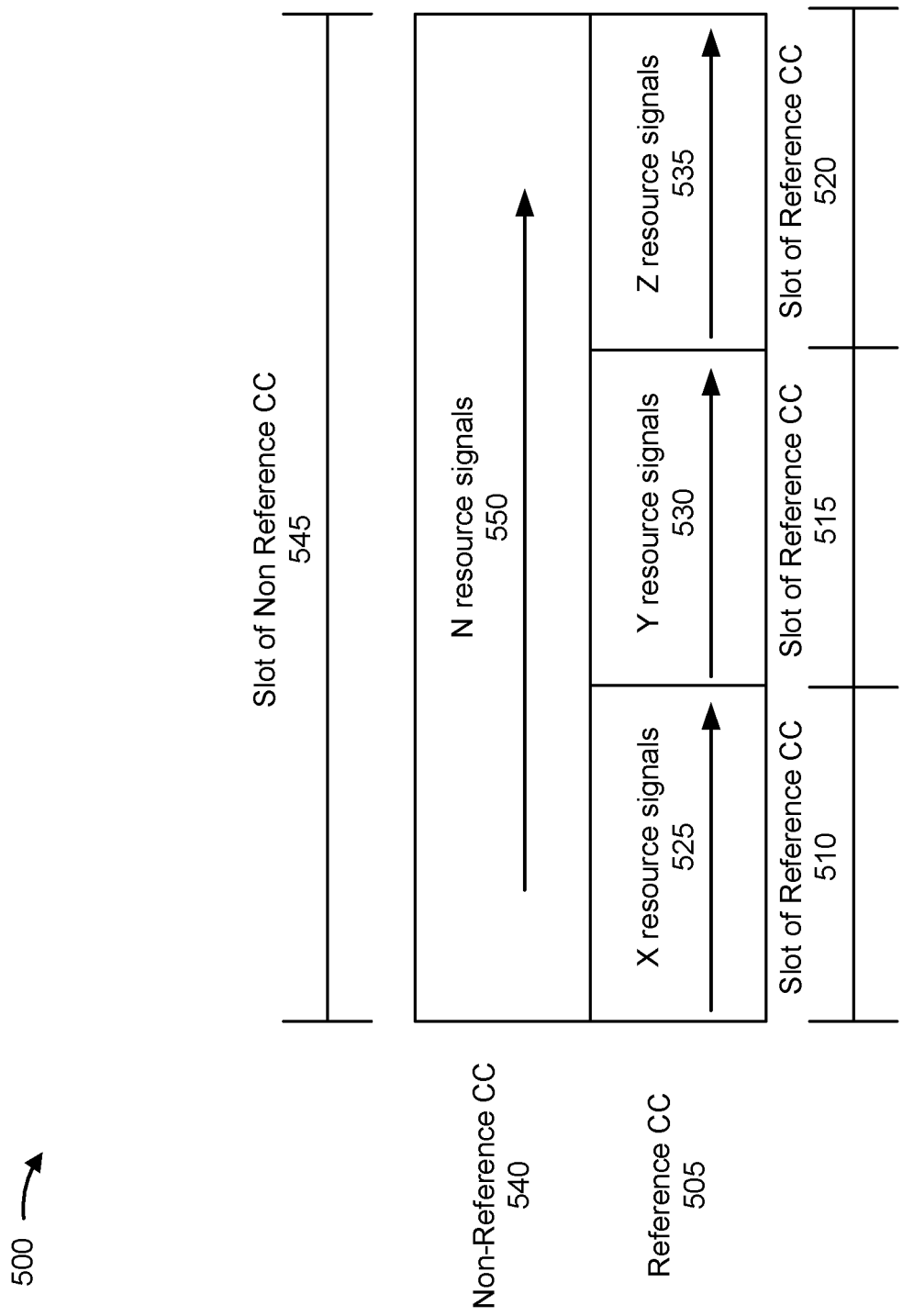

FIG. 5 is a diagram illustrating an example 500 of indicating resource signal reception capability for multiple component carriers, in accordance with the present disclosure. As shown in FIG. 5, a UE (for example, UE 120) may communicate with a base station (for example, base station 110). In some aspects, the UE and the base station may be part of a wireless network (for example, wireless network 100). In some aspects, the UE and the base station may communicate via one or more component carriers.

As shown in FIG. 5, the UE may be configured with a reference component carrier 505. The reference component carrier 505 may be configured with a first slot 510 of the reference component carrier 505, a second slot 515 of the reference component carrier 505, and a third slot 520 of the reference component carrier 505. The UE may be configured to receive X resource signals 525 in the first slot 510, Y resource 530 signals in the second slot 515, and Z resource signals 535 in the third slot 520.

As further shown in FIG. 5, the UE may be configured with a non-reference component carrier 540. The non-reference component carrier 540 may be configured with a slot 545 of the non-reference component carrier 540. The UE may be configured to receive N resource signals in the slot 545.

In some aspects, the UE may be configured to add the N resource signals 550 to the X resource signals 525 based at least in part on a configuration that the number of resource signals is based at least in part on a number of resource signals having a starting symbol within the reference slot. In this case, the UE may report a capability to receive X+N resource signals in the first slot 510, Y resource signals in the second slot 515, and Z resource signals in the third slot 520.

In some aspects, the UE may be configured to add the N resource signals 550 to the Z resource signals 535 based at least in part on a configuration that the number of resource signals is based at least in part on a number of resource signals having a last symbol within the reference slot. In this case, the UE may report a capability to receive X resource signals in the first slot 510, Y resource signals in the second slot 515, and Z+N resource signals in the third slot 520.

In some aspects, the UE may be configured to add the N resource signals 550 to the X resource signals 525, the Y resource signals 530, and the Z resource signals 535 based at least in part on a configuration that the number of resource signals is based at least in part on a number of resource signals having at least one symbol within the reference slot. In this case, the UE may report a capability to receive X+N resource signals in the first slot 510, Y+N reference resources in the second slot 515, and Z+N resource signals in the third slot 520.

As indicated above, FIG. 5 is provided as an example. Other examples may differ from what is described with regard to FIG. 5.

Figure 6:
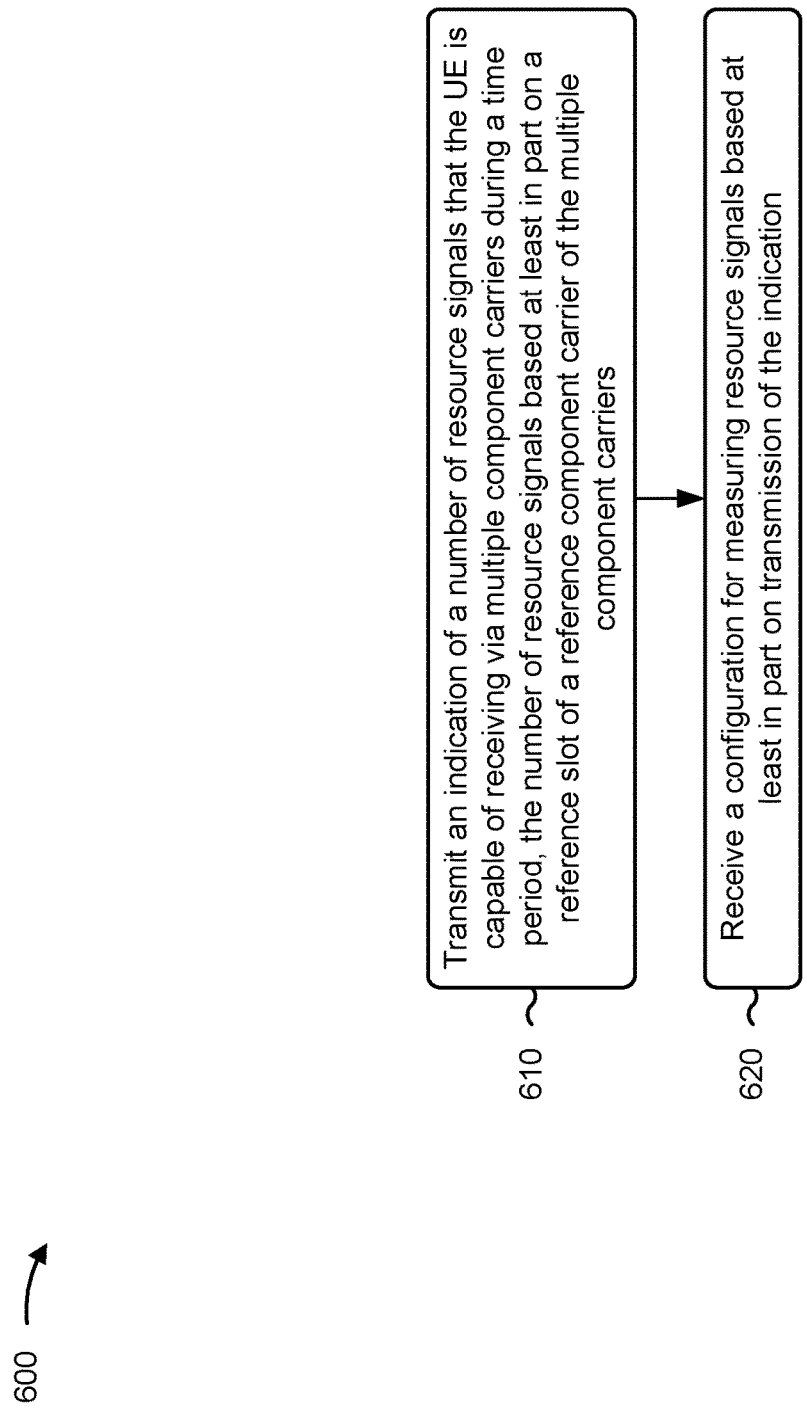
FIGS. 6 and 7 are diagrams illustrating example processes associated with resource signal reception capability for multiple component carriers, in accordance with the present disclosure.

FIG. 6 is a diagram illustrating an example process 600 performed, for example, by a UE, in accordance with the present disclosure. Example process 600 is an example where the UE (e.g., UE 120) performs operations associated with resource signal reception capability for multiple component carriers.

As shown in FIG. 6, in some aspects, process 600 may include transmitting an indication of a number of resource signals that the UE is capable of receiving via multiple component carriers during a time period, the number of resource signals based at least in part on a reference slot of a reference component carrier of the multiple component carriers (block 610). For example, the UE (e.g., using transmission component 804, depicted in FIG. 8) may transmit an indication of a number of resource signals that the UE is capable of receiving via multiple component carriers during a time period, the number of resource signals based at least in part on a reference slot of a reference component carrier of the multiple component carriers, as described above.

As further shown in FIG. 6, in some aspects, process 600 may include receiving a configuration for measuring resource signals based at least in part on transmission of the indication (block 620). For example, the UE (e.g., using reception component 802, depicted in FIG. 8) may receive a configuration for measuring resource signals based at least in part on transmission of the indication, as described above.

Process 600 may include additional aspects, such as any single aspect or any combination of aspects described below and/or in connection with one or more other processes described elsewhere herein.

In a first aspect, a numerology of the reference component carrier is different from a numerology of a non-reference component carrier of the multiple component carriers.

In a second aspect, alone or in combination with the first aspect, the reference component carrier is configured with a shortest slot duration of the multiple component carriers.

In a third aspect, alone or in combination with one or more of the first and second aspects, the reference slot is associated with one or more of a synchronization signal block resource, a channel state information reference signal resource, or an interference measurement resource.

In a fourth aspect, alone or in combination with one or more of the first through third aspects, the reference slot is associated with one or more of a synchronization signal block, a channel state information reference signal, a beam management reference signal, a pathloss reference signal, a beam failure reference signal, a radio link management reference signal, or a new beam identification reference signal.

In a fifth aspect, alone or in combination with one or more of the first through fourth aspects, the number of resource signals is based at least in part on a maximum number of resource signals that the UE is capable of receiving via the multiple component carriers during the reference slot.

In a sixth aspect, alone or in combination with one or more of the first through fifth aspects, the number of resource signals includes resource signals having a starting symbol within the reference slot.

In a seventh aspect, alone or in combination with one or more of the first through sixth aspects, the number of resource signals includes resource signals having a last symbol within the reference slot.

In an eighth aspect, alone or in combination with one or more of the first through seventh aspects, the number of resource signals includes resource signals having at least one symbol within the reference slot.

In a ninth aspect, alone or in combination with one or more of the first through eighth aspects, the number of resource signals is based at least in part on time durations of the resource signals.

In a tenth aspect, alone or in combination with one or more of the first through ninth aspects, the number of resource signals is based at least in part on usage of the resource signals.

In an eleventh aspect, alone or in combination with one or more of the first through tenth aspects, the number of resource signals is based at least in part on one or more of incrementing a count of the resource signals based at least in part on usage of a resource signal for beam failure detection or for radio link management, incrementing the count of the resource signals based at least in part on usage of the resource signal for new beam identification, for pathloss measurement, or for layer 1 reference signal received power measurement, or incrementing the count of the resource signals based at least in part on each usage of the resource signal for layer 1 signal-to-interference-plus-noise ratio measurement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
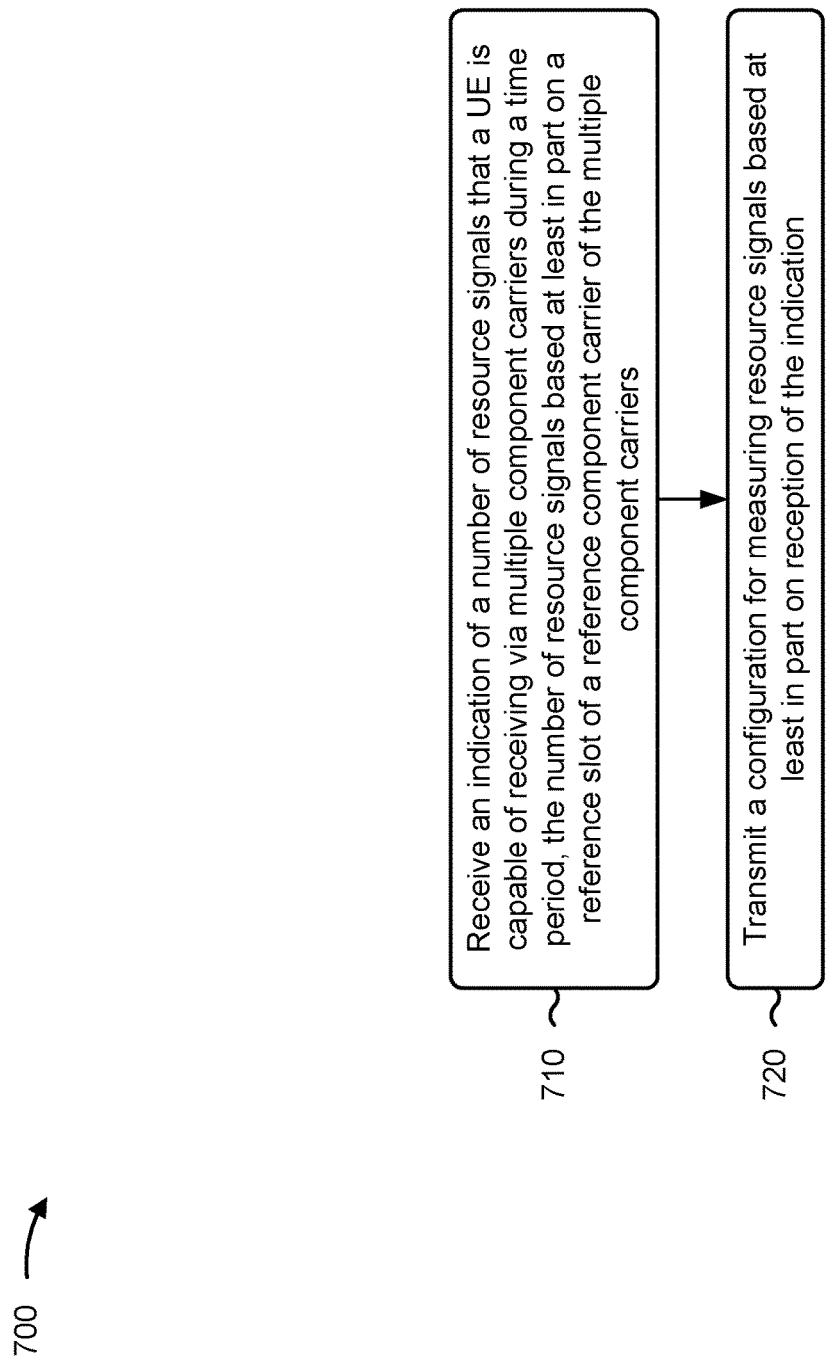

FIG. 7 is a diagram illustrating an example process 700 performed, for example, by a base station, in accordance with the present disclosure. Example process 700 is an example where the base station (e.g., base station 110) performs operations associated with resource signal reception capability for multiple component carriers.

As shown in FIG. 7, in some aspects, process 700 may include receiving an indication of a number of resource signals that a UE is capable of receiving via multiple component carriers during a time period, the number of resource signals based at least in part on a reference slot of a reference component carrier of the multiple component carriers (block 710). For example, the base station (e.g., using reception component 902, depicted in FIG. 9) may receive an indication of a number of resource signals that a UE is capable of receiving via multiple component carriers during a time period, the number of resource signals based at least in part on a reference slot of a reference component carrier of the multiple component carriers, as described above.

As further shown in FIG. 7, in some aspects, process 700 may include transmitting a configuration for measuring resource signals based at least in part on reception of the indication (block 720). For example, the base station (e.g., using transmission component 904, depicted in FIG. 9) may transmit a configuration for measuring resource signals based at least in part on reception of the indication, as described above.

Process 700 may include additional aspects, such as any single aspect or any combination of aspects described below and/or in connection with one or more other processes described elsewhere herein.

In a first aspect, a numerology of the reference component carrier is different from a numerology of a non-reference component carrier of the multiple component carriers.

In a second aspect, alone or in combination with the first aspect, the reference component carrier is configured with a shortest slot duration of the multiple component carriers.

In a third aspect, alone or in combination with one or more of the first and second aspects, the reference slot is associated with one or more of a synchronization signal block resource, a channel state information reference signal resource, or an interference measurement resource.

In a fourth aspect, alone or in combination with one or more of the first through third aspects, the reference slot is associated with one or more of a synchronization signal block, a channel state information reference signal, a beam management reference signal, a pathloss reference signal, a beam failure reference signal, a radio link management reference signal, or a new beam identification reference signal.

In a fifth aspect, alone or in combination with one or more of the first through fourth aspects, the number of resource signals is based at least in part on a maximum number of resource signals that the UE is capable of receiving via the multiple component carriers during the reference slot.

In a sixth aspect, alone or in combination with one or more of the first through fifth aspects, the number of resource signals includes resource signals having a starting symbol within the reference slot.

In a seventh aspect, alone or in combination with one or more of the first through sixth aspects, the number of resource signals includes resource signals having a last symbol within the reference slot.

In an eighth aspect, alone or in combination with one or more of the first through seventh aspects, the number of resource signals includes resource signals having at least one symbol within the reference slot.

In a ninth aspect, alone or in combination with one or more of the first through eighth aspects, the number of resource signals is based at least in part on time durations of the resource signals.

In a tenth aspect, alone or in combination with one or more of the first through ninth aspects, the number of resource signals is based at least in part on usage of the resource signals.

In an eleventh aspect, alone or in combination with one or more of the first through tenth aspects, the number of resource signals is based at least in part on one or more of incrementing a count of the resource signals based at least in part on usage of a resource signal for beam failure detection or for radio link management, incrementing the count of the resource signals based at least in part on usage of the resource signal for new beam identification, for pathloss measurement, or for layer 1 reference signal received power measurement, or incrementing the count of the resource signals based at least in part on each usage of the resource signal for layer 1 signal-to-interference-plus-noise ratio measurement.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
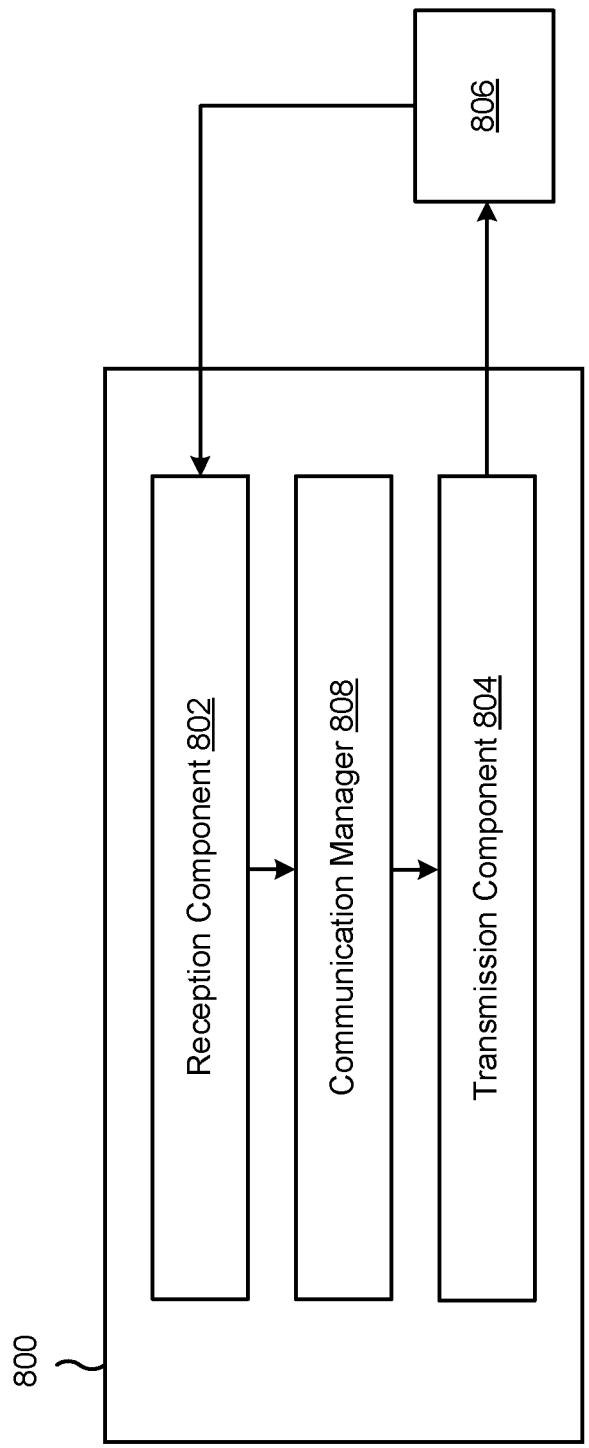
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part on as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit an indication of a number of resource signals that the UE is capable of receiving via multiple component carriers during a time period, the number of resource signals based at least in part on a reference slot of a reference component carrier of the multiple component carriers. The reception component 802 may receive a configuration for measuring resource signals based at least in part on transmission of the indication.

The communication manager 808 may manage communications with the apparatus 806. For example, the communication manager 808 may make determinations based at least in part on communications received via the reception component 802 and/or may provide instructions for transmitting communication via the transmission component 804.

The number and arrangement of components shown in FIG. 8 are provided as an example. In practice, there may be additional components, fewer components, different components, or differently arranged components than those shown in FIG. 8.

Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
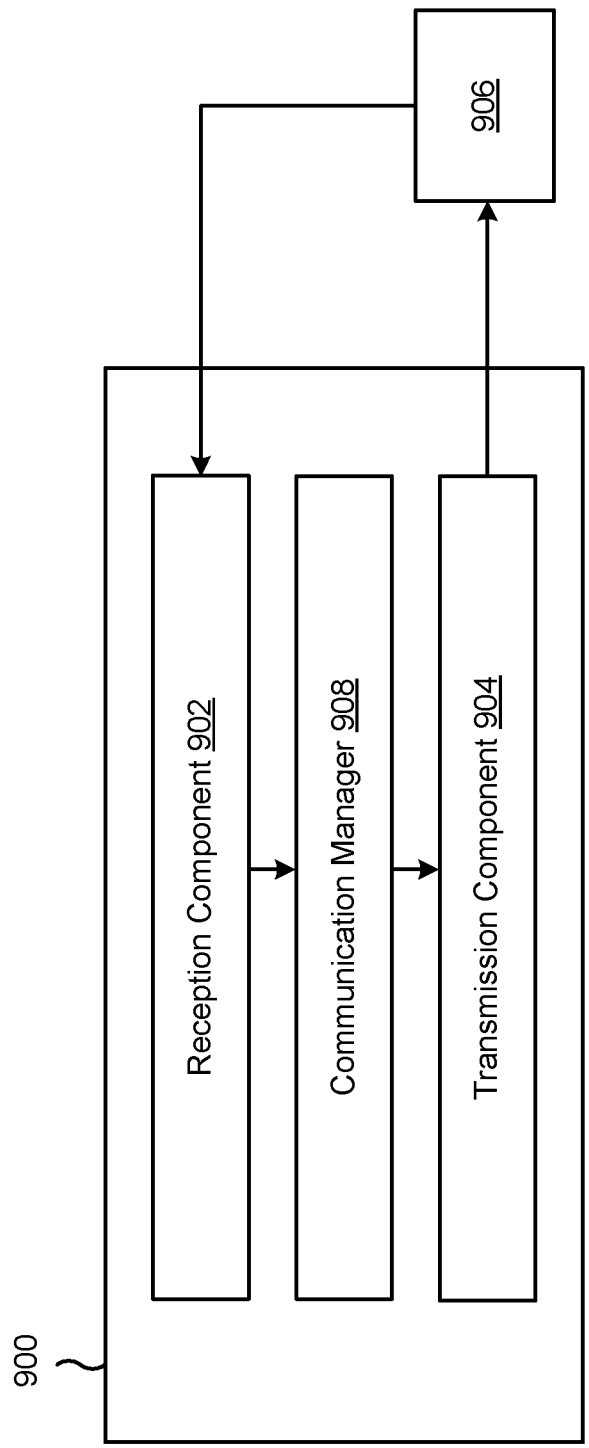

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part on as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive an indication of a number of resource signals that a UE is capable of receiving via multiple component carriers during a time period, the number of resource signals based at least in part on a reference slot of a reference component carrier of the multiple component carriers. The transmission component 904 may transmit a configuration for measuring resource signals based at least in part on reception of the indication.

The communication manager 908 may manage communications with the apparatus 906. For example, the communication manager 908 may make determinations based at least in part on communications received via the reception component 902 and/or may provide instructions for transmitting communication via the transmission component 904.

The number and arrangement of components shown in FIG. 9 are provided as an example. In practice, there may be additional components, fewer components, different components, or differently arranged components than those shown in FIG. 9.

Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting an indication of a number of resource signals that the UE is capable of receiving via multiple component carriers during a time period, the number of resource signals based at least in part on a reference slot of a reference component carrier of the multiple component carriers; and receiving a configuration for measuring resource signals based at least in part on transmission of the indication.

Aspect 2: The method of Aspect 1, wherein a numerology of the reference component carrier is different from a numerology of a non-reference component carrier of the multiple component carriers.

Aspect 3: The method of any of Aspects 1-2, wherein the reference component carrier is configured with a shortest slot duration of the multiple component carriers.

Aspect 4: The method of any of Aspects 1-3, wherein the reference slot is associated with one or more of: a synchronization signal block resource, a channel state information reference signal resource, or an interference measurement resource.

Aspect 5: The method of any of Aspects 1-4, wherein the reference slot is associated with one or more of: a synchronization signal block, a channel state information reference signal, a beam management reference signal, a pathloss reference signal, a beam failure reference signal, a radio link management reference signal, or a new beam identification reference signal.

Aspect 6: The method of any of Aspects 1-5, wherein the number of resource signals is based at least in part on a maximum number of resource signals that the UE is capable of receiving via the multiple component carriers during the reference slot.

Aspect 7: The method of any of Aspects 1-6, wherein the number of resource signals includes resource signals having a starting symbol within the reference slot.

Aspect 8: The method of any of Aspects 1-6, wherein the number of resource signals includes resource signals having a last symbol within the reference slot.

Aspect 9: The method of any of Aspects 1-6, wherein the number of resource signals includes resource signals having at least one symbol within the reference slot.

Aspect 10: The method of any of Aspects 1-9, wherein the number of resource signals is based at least in part on time durations of the resource signals.

Aspect 11: The method of any of Aspects 1-9, wherein the number of resource signals is based at least in part on usage of the resource signals.

Aspect 12: The method of Aspect 11, wherein the number of resource signals is based at least in part on one or more of: incrementing a count of the resource signals based at least in part on usage of a resource signal for beam failure detection or for radio link management; incrementing the count of the resource signals based at least in part on usage of the resource signal for new beam identification, for pathloss measurement, or for layer 1 reference signal received power measurement; or incrementing the count of the resource signals based at least in part on each usage of the resource signal for layer 1 signal-to-interference-plus-noise ratio measurement.

Aspect 13: A method of wireless communication performed by a base station, comprising: receiving an indication of a number of resource signals that a user equipment (UE) is capable of receiving via multiple component carriers during a time period, the number of resource signals based at least in part on a reference slot of a reference component carrier of the multiple component carriers; and transmitting a configuration for measuring resource signals based at least in part on reception of the indication.

Aspect 14: The method of Aspect 13, wherein a numerology of the reference component carrier is different from a numerology of a non-reference component carrier of the multiple component carriers.

Aspect 15: The method of any of Aspects 13-14, wherein the reference component carrier is configured with a shortest slot duration of the multiple component carriers.

Aspect 16: The method of any of Aspects 13-15, wherein the reference slot is associated with one or more of: a synchronization signal block resource, a channel state information reference signal resource, or an interference measurement resource.

Aspect 17: The method of any of Aspects 13-16, wherein the reference slot is associated with one or more of: a synchronization signal block, a channel state information reference signal, a beam management reference signal, a pathloss reference signal, a beam failure reference signal, a radio link management reference signal, or a new beam identification reference signal.

Aspect 18: The method of any of Aspects 13-17, wherein the number of resource signals is based at least in part on a maximum number of resource signals that the UE is capable of receiving via the multiple component carriers during the reference slot.

Aspect 19: The method of any of Aspects 13-18, wherein the number of resource signals includes resource signals having a starting symbol within the reference slot.

Aspect 20: The method of any of Aspects 13-18, wherein the number of resource signals includes resource signals having a last symbol within the reference slot.

Aspect 21: The method of any of Aspects 13-18, wherein the number of resource signals includes resource signals having at least one symbol within the reference slot.

Aspect 22: The method of any of Aspects 13-21, wherein the number of resource signals is based at least in part on time durations of the resource signals.

Aspect 23: The method of any of Aspects 13-22, wherein the number of resource signals is based at least in part on usage of the resource signals.

Aspect 24: The method of any of Aspects 13-23, wherein the number of resource signals is based at least in part on one or more of: incrementing a count of the resource signals based at least in part on usage of a resource signal for beam failure detection or for radio link management; incrementing the count of the resource signals based at least in part on usage of the resource signal for new beam identification, for pathloss measurement, or for layer 1 reference signal received power measurement; or incrementing the count of the resource signals based at least in part on each usage of the resource signal for layer 1 signal-to-interference-plus-noise ratio measurement.

Aspect 25: An apparatus for wireless communication at a device, comprising a processor; memory coupled with the processor; and instructions stored in the memory and executable by the processor to cause the apparatus to perform the method of one or more Aspects of Aspects 1-24.

Aspect 26: A device for wireless communication, comprising a memory and one or more processors coupled to the memory, the memory and the one or more processors configured to perform the method of one or more Aspects of Aspects 1-24.

Aspect 27: An apparatus for wireless communication, comprising at least one means for performing the method of one or more Aspects of Aspects 1-24.

Aspect 28: A non-transitory computer-readable medium storing code for wireless communication, the code comprising instructions executable by a processor to perform the method of one or more Aspects of Aspects 1-24.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting an indication of a number of resource signals that the UE is capable of receiving via multiple component carriers during a time period, the number of resource signals based at least in part on a reference slot of a reference component carrier of the multiple component carriers; and
receiving a configuration for measuring resource signals based at least in part on transmission of the indication.

2. The method of claim 1, wherein a numerology of the reference component carrier is different from a numerology of a non-reference component carrier of the multiple component carriers.

3. The method of claim 1, wherein the reference component carrier is configured with a shortest slot duration of the multiple component carriers.

4. The method of claim 1, wherein the reference slot is associated with one or more of:
a synchronization signal block resource,
a channel state information reference signal resource, or
an interference measurement resource.

5. The method of claim 1, wherein the number of resource signals is based at least in part on a maximum number of resource signals that the UE is capable of receiving via the multiple component carriers during the reference slot.

6. The method of claim 1, wherein the number of resource signals includes resource signals having a starting symbol within the reference slot.

7. The method of claim 1, wherein the number of resource signals includes resource signals having a last symbol within the reference slot.

8. The method of claim 1, wherein the number of resource signals includes resource signals having at least one symbol within the reference slot.

9. The method of claim 1, wherein the number of resource signals is based at least in part on time durations of the resource signals.

10. The method of claim 1, wherein the number of resource signals is based at least in part on usage of the resource signals.

11. The method of claim 10, wherein the number of resource signals is based at least in part on one or more of:
incrementing a count of the resource signals based at least in part on usage of a resource signal for beam failure detection or for radio link management;
incrementing the count of the resource signals based at least in part on usage of the resource signal for new beam identification, for pathloss measurement, or for layer 1 reference signal received power measurement; or
incrementing the count of the resource signals based at least in part on each usage of the resource signal for layer 1 signal-to-interference-plus-noise ratio measurement.

12. A user equipment (UE) for wireless communication, comprising:
a memory; and
one or more processors operatively coupled to the memory, the memory and the one or more processors configured to:
transmit an indication of a number of resource signals that the UE is capable of receiving via multiple component carriers during a time period, the number of resource signals based at least in part on a reference slot of a reference component carrier of the multiple component carriers; and
receive a configuration for measuring resource signals based at least in part on transmission of the indication.

13. The UE of claim 12, wherein a numerology of the reference component carrier is different from a numerology of a non-reference component carrier of the multiple component carriers.

14. The UE of claim 12, wherein the reference component carrier is configured with a shortest slot duration of the multiple component carriers.

15. The UE of claim 12, wherein the reference slot is associated with one or more of:
a synchronization signal block resource,
a channel state information reference signal resource, or
an interference measurement resource.

16. The UE of claim 12, wherein the number of resource signals is based at least in part on a maximum number of resource signals that the UE is capable of receiving via the multiple component carriers during the reference slot.

17. The UE of claim 12, wherein the number of resource signals includes resource signals having a starting symbol within the reference slot.

18. The UE of claim 12, wherein the number of resource signals includes resource signals having a last symbol within the reference slot.

19. The UE of claim 12, wherein the number of resource signals includes resource signals having at least one symbol within the reference slot.

20. The UE of claim 12, wherein the number of resource signals is based at least in part on time durations of the resource signals.

21. The UE of claim 12, wherein the number of resource signals is based at least in part on usage of the resource signals.

22. The UE of claim 21, wherein the number of resource signals is based at least in part on one or more of:
incrementing a count of the resource signals based at least in part on usage of a resource signal for beam failure detection or for radio link management;
incrementing the count of the resource signals based at least in part on usage of the resource signal for new beam identification, for pathloss measurement, or for layer 1 reference signal received power measurement; or
incrementing the count of the resource signals based at least in part on each usage of the resource signal for layer 1 signal-to-interference-plus-noise ratio measurement.

23. A non-transitory computer-readable medium storing a set of instructions for wireless communication, the set of instructions comprising:
one or more instructions that, when executed by one or more processors of a user equipment (UE), cause the UE to:
transmit an indication of a number of resource signals that the UE is capable of receiving via multiple component carriers during a time period, the number of resource signals based at least in part on a reference slot of a reference component carrier of the multiple component carriers; and receive a configuration for measuring resource signals based at least in part on transmission of the indication.

24. An apparatus for wireless communication, comprising:

means for transmitting an indication of a number of resource signals that the apparatus is capable of receiving via multiple component carriers during a time period, the number of resource signals based at least in part on a reference slot of a reference component carrier of the multiple component carriers; and means for receiving a configuration for measuring resource signals based at least in part on transmission of the indication.

25. The apparatus of claim 24, wherein a numerology of the reference component carrier is different from a numerology of a non-reference component carrier of the multiple component carriers.

26. The apparatus of claim 24, wherein the reference component carrier is configured with a shortest slot duration of the multiple component carriers.

27. The apparatus of claim 24, wherein the reference slot is associated with one or more of:
a synchronization signal block resource,
a channel state information reference signal resource, or
an interference measurement resource.

28. The apparatus of claim 24, wherein the reference slot is associated with one or more of:
a synchronization signal block,
a channel state information reference signal,
a beam management reference signal,
a pathloss reference signal,
a beam failure reference signal,
a radio link management reference signal, or
a new beam identification reference signal.

29. The apparatus of claim 24, wherein the number of resource signals is based at least in part on a maximum number of resource signals that the apparatus is capable of receiving via the multiple component carriers during the reference slot.

30. The apparatus of claim 24, further comprising means for signals having a starting symbol within the reference slot.

31. The apparatus of claim 24, further comprising means for signals having a last symbol within the reference slot.

32. The apparatus of claim 24, further comprising means for signals having at least one symbol within the reference slot.

33. The apparatus of claim 24, wherein the number of resource signals is based at least in part on time durations of the resource signals.

34. The apparatus of claim 24, wherein the number of resource signals is based at least in part on usage of the resource signals.

35. The apparatus of claim 34, wherein the number of resource signals is based at least in part on one or more of:
means for incrementing a count of the resource signals based at least in part on usage of a resource signal for beam failure detection or for radio link management;
means for incrementing the count of the resource signals based at least in part on usage of the resource signal for new beam identification, for pathloss measurement, or for layer 1 reference signal received power measurement; or
means for incrementing the count of the resource signals based at least in part on each usage of the resource signal for layer 1 signal-to-interference-plus-noise ratio measurement.

* * * * *